United States Patent
Tomizawa et al.

(10) Patent No.: US 8,811,931 B2
(45) Date of Patent: Aug. 19, 2014

(54) RADIO APPARATUS

(75) Inventors: Takeshi Tomizawa, Yokohama (JP); Tomoya Tandai, Kawasaki (JP); Ryoko Matsuo, Shinagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 164 days.

(21) Appl. No.: 13/583,803

(22) PCT Filed: Apr. 6, 2010

(86) PCT No.: PCT/JP2010/002507
§ 371 (c)(1),
(2), (4) Date: Nov. 20, 2012

(87) PCT Pub. No.: WO2011/125118
PCT Pub. Date: Oct. 13, 2011

(65) Prior Publication Data
US 2013/0210367 A1 Aug. 15, 2013

(51) Int. Cl.
*H04B 1/16* (2006.01)
*H04W 52/02* (2009.01)
*H04B 1/04* (2006.01)

(52) U.S. Cl.
CPC ...... *H04W 52/0225* (2013.01); *H04W 52/0258* (2013.01)
USPC .................................. 455/343.1; 455/127.5

(58) Field of Classification Search
USPC ........ 455/127.5, 343.1–343.4, 574; 340/7.33, 340/7.34
See application file for complete search history.

(56) References Cited

FOREIGN PATENT DOCUMENTS

| JP | 2006500829 A | 1/2006 |
|---|---|---|
| JP | 2007-202134 A | 8/2007 |
| JP | 2010-045561 A | 2/2010 |

OTHER PUBLICATIONS

English translation of Japanese Office Action dated Oct. 4, 2013 corresponding to Japanese Patent App. No. 2012-509178, 3 pp.
English translation of Written Opinion dated Nov. 9, 2012 from corresponding International Application No. PCT/JP2010/002507, 5 pp.
English translation of International Preliminary Report on Patentability dated Nov. 13, 2012 from corresponding International Application No. PCT/JP2010/002507, 6 pp.
International Search Report dated Jun. 15, 2010 from PCT/JP2010/002507.

*Primary Examiner* — Lee Nguyen
(74) *Attorney, Agent, or Firm* — Ohlandt, Greeley, Ruggiero & Perle, L.L.P.

(57) ABSTRACT

According to one embodiment, a radio apparatus includes: a radio unit; a timer configured to count a first measurement time; a control unit configured to establish a first mode if the first measurement time is shorter than a first time, and establish a second mode if the first measurement time is longer than or equal to the first time; and a power control unit configured to control power to be supplied to the radio unit if the first mode is set and next data is not received even if a second time elapsed, and control power to be supplied to the radio unit if the second mode is set and next data is not received even if a third time elapsed, wherein the radio unit makes a transition to a sleep mode as a result of a power control by the power control unit.

4 Claims, 6 Drawing Sheets

RADIO APPARATUS

CROSS-REFERENCE TO RELATED APPLICATION(S)

This is a Continuation application of PCT Application No. PCT/JP2010/002507, filed on Apr. 6, 2010, which was published under PCT Article 21(2) in Japanese, the entire contents of which are incorporated herein by reference.

FIELD

This disclosure relates to a radio apparatus.

BACKGROUND ART

In a related art, a first radio apparatus is in a sleep mode (i.e., it is not operating except that it performs carrier sensing every constant interval), and a second radio apparatus activates the first radio apparatus by sending it a search request packet that is longer than the above constant interval. If the first radio apparatus is not activated even after the sending of the search request packet, the second radio apparatus sends an even longer packet. In this manner, the operation of the first radio apparatus can be suspended for longer intervals, whereby a low power consumption is realized.

DETAILED DESCRIPTION

Embodiments of the present invention will be hereinafter described with reference to the drawings. In the following embodiments, it is assumed that items that are given the same numeral operate in the same manner or similar manners and they will not be described redundantly.

According to one embodiment, a radio apparatus configured to send or receive data with a communication partner after performing connection processing, the radio apparatus includes: a radio unit configured to transmit and receive the data; a timer configured to count a first measurement time from completion of the connection processing to transmission or reception of the data; a control unit configured to establish a first mode if the first measurement time is shorter than a first time T1, and establish a second mode if the first measurement time is longer than or equal to the first time T1; and a power control unit configured to control power to be supplied to the radio unit if the first mode is set and next data is not received even if a second time T2 elapsed from transmission or reception of the data by the radio unit, and control power to be supplied to the radio unit if the second mode is set and next data is not received even if a third time T3 (T3>T2) elapsed from reception of the data by the radio unit, wherein the radio unit makes a transition to a sleep mode as a result of a power control by the power control unit.

Figure 1A:
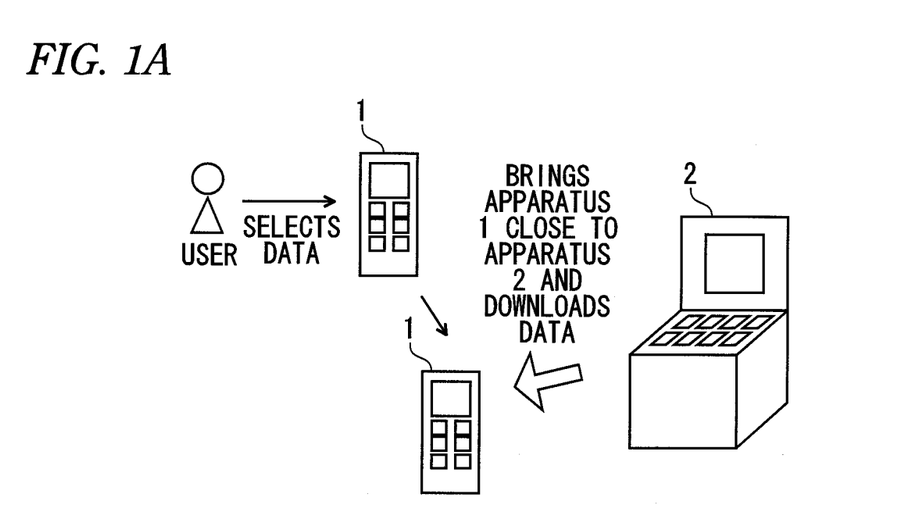
FIG. 1A illustrates an advance selection mode of a radio system.
Figure 1B:
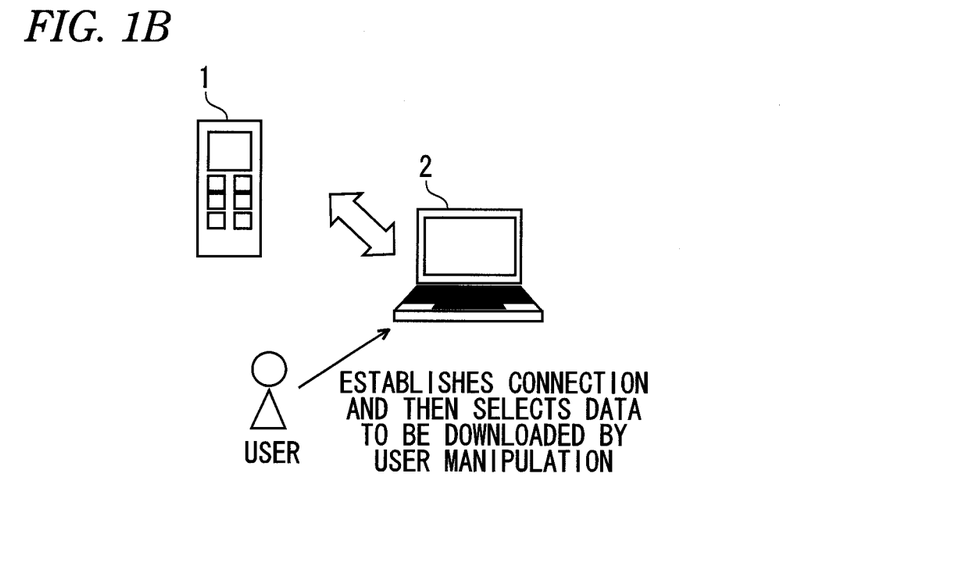
FIG. 1B illustrates a post-selection mode of a radio system.

Radio systems according to the embodiments of the invention will be outlined with reference to FIGS. 1A and 1B. The radio system has a first radio apparatus 1 and a second radio apparatus 2 which perform connection processing when they are brought close to each other.

For example, as shown in FIG. 1A, when a user having the first radio apparatus 1 such as a portable terminal selects data he or she wants to download and then bring the first radio apparatus 1 close to the second radio apparatus 2, a connection is established between the first radio apparatus 1 and the second radio apparatus 2 and the data is transmitted between them. This is called an advance selection mode (first mode) because data to be communicated is determined in advance. An example of the second radio apparatus 2 is an information KIOSK terminal.

On the other hand, as shown in FIG. 1B, there may occur a case that a user connects a first radio apparatus 1 and a second radio apparatus 2 and then selects data to be communicated. This is called a post-selection mode (second mode) because data to be communicated is determined after establishment of a connection. In this case, for example, the first radio apparatus 1 is a portable terminal and the second radio apparatus 2 is a PC.

A radio system according to a first embodiment of the invention will be described. The radio system has a first radio apparatus 1 and a second radio apparatus 2.

Figure 2:
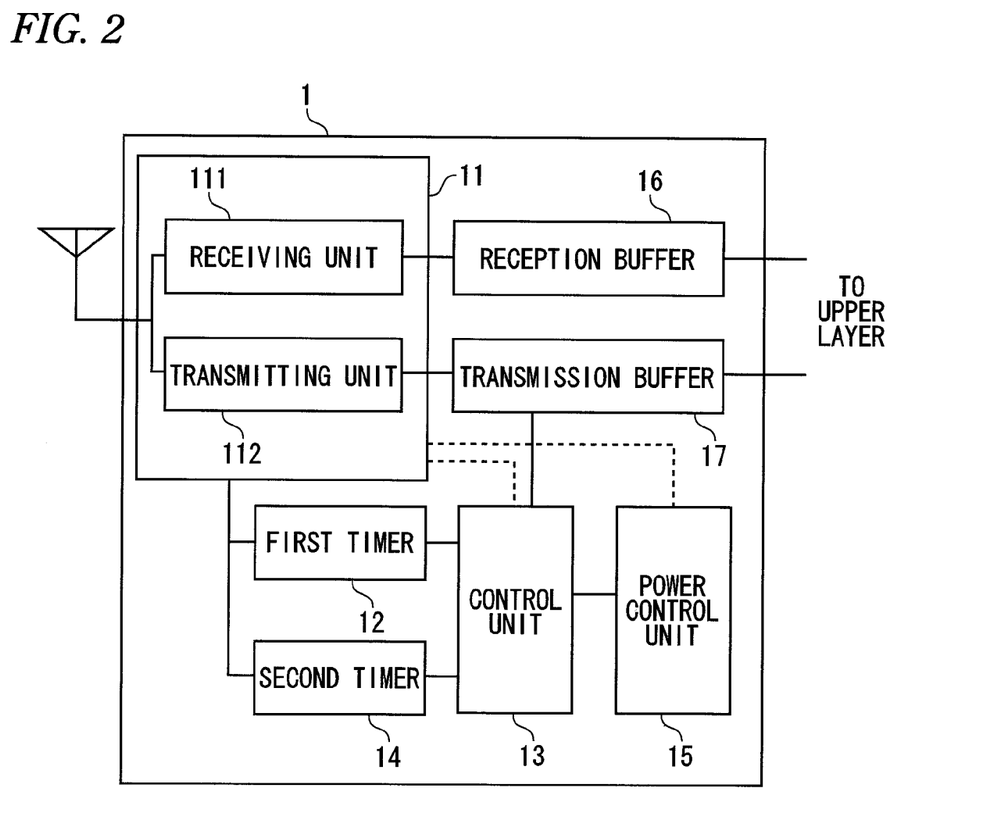
FIG. 2 shows a first radio apparatus 1 according to a first embodiment.

The first radio apparatus 1 will be described with reference to FIG. 2. The first radio apparatus 1 has a radio unit 11 for sending and receiving signals (e.g., connection request) that are necessary for connection processing and for sending and receiving data, a first timer 12 for counting a first measurement time from completion of connection processing to transmission or reception of data, and a control unit 13 for setting the advance selection mode if the first measurement time is shorter than a first time T1 and sets the post-selection mode if the first measurement time is longer than or equal to the first time T1. The first radio apparatus 1 has a second timer 14 for counting, as a second measurement time, an elapsed time from transmission or reception of data by the radio unit 13 and a power control unit 15 for controlling the power to be supplied to the radio unit 11 if the advance selection mode is set and the next data has not been received even if the second elapsed time has become longer than a second time T2 and for controlling the power to be supplied to the radio unit 11 if the post-selection mode is established and the next data has not been received even if the second elapsed time has become longer than a third time T3 (T3>T2). The radio unit 11 makes a transition to a sleep mode as a result of control of the supply of power to it by the power control unit 13.

The radio unit 11 of the first radio apparatus 1 has a receiving unit 111 and a transmitting unit 112. The first radio apparatus 1 has a reception buffer 16 for temporarily holding received data and a transmission buffer 17 for temporarily holding data to be sent.

The individual units of the first radio apparatus 1 will be described in detail.

The receiving unit 111 of the radio unit 11 generates a reception signal by performing, on a radio signal received by an antenna, pieces of signal processing suitable for the radio system such as demodulation processing, decoding processing, anti-aliasing filter processing, frequency conversion processing, and low-noise amplification processing. The reception signal includes data, a connection request signal, a connection response signal, etc. The receiving unit 111 passes the reception signal to the reception buffer 116. When a transition to the sleep mode has been made, the receiving unit 111 suspends its operation except that it performs carrier sense processing at intervals corresponding to the advance selection mode or the post-selection mode. After performing carrier sense processing, the receiving unit 111 informs the control unit 13 of a detected power value.

The transmitting unit 112 generates a radio signal by performing, on a transmission signal received from the transmission buffer 117 or a wake signal received from the control unit 13, pieces of signal processing suitable for the radio system such as modulation processing, coding processing, waveform shaping filter processing, frequency conversion processing, and power amplification processing. The radio signal is sent to the second radio apparatus 2 via the antenna. The transmission signal includes data, a connection request signal, a connection response signal, etc. When a transition to the sleep mode has been made, the transmitting unit 112 suspends its operation.

The reception buffer 16 receives a reception signal from the receiving unit 111 and holds it temporarily. The reception buffer 16 passes the reception signal being held to an upper layer (not shown). The transmission buffer 17 temporarily holds a transmission signal received from the upper layer (not shown). When receiving a transmission from the upper layer, the transmission buffer 17 informs the control unit 13 of that fact. The transmission buffer 17 passes the transmission signal being held to the transmitting unit 112.

When the radio unit 11 has completed connection processing, the first timer 12 receives a measurement start notice from the radio unit 11. More specifically, the first timer 12 receives a measurement start notice from the transmitting unit 112 if the first radio apparatus 1 sends a connection response, and receives a measurement start notice from the receiving unit 111 if the first radio apparatus 1 receives a connection response. The first timer 12 starts a time measurement upon reception of the measurement start notice. If data is sent or received after completion of the connection processing, the first timer 12 receives a measurement end notice. More specifically, the first timer 12 receives a measurement end notice from the transmitting unit 112 if the first radio apparatus 1 sends data, and receives a measurement end notice from the receiving unit 111 if the first radio apparatus 1 receives data. The first timer 12 finishes the time measurement upon reception of the measurement end notice. The first timer 12 passes a measured time to the control unit 13 as a first measurement time.

The second timer 14 measures, as a second elapsed time, an elapsed time from transmission or reception of a radio signal by the radio unit 11. When receiving, from the receiving unit 111 or the transmitting unit 112 of the radio unit 11, a notice to the effect that it has received or sent a radio signal, the second timer 14 starts measurement of a second elapsed time. When receiving a notice from the radio unit 11, the second timer 14 resets the time that has been measured so far and starts measurement of a new time. That is, the second timer 14 measures, as a second elapsed time, a time from the reception or transmission of the radio signal by the radio unit 11 to reception of the next signal.

In the sleep mode, the second timer 14 measures, as a third elapsed time, an elapsed time from carrier sense processing by the receiving unit 111. When having performed carrier sense processing, the receiving unit 111 communicates a notice to that effect to the second timer 14. When receiving the notice, the second timer 14 starts a time measurement. When receiving a notice to the effect that carrier sense processing has performed, the second timer 14 resets the time that has been measured so far and starts measurement of a new time. That is, the second timer 14 measures, as a third elapsed time, a carrier sense interval from the carrier sense processing performed by the receiving unit 111 to the next carrier sense processing. The second timer 14 informs the control unit 13 of times measured in constant cycles (second elapsed times or third elapsed times) to the control unit 13.

The control unit 13 performs a control as to whether the first radio apparatus 1 should operate in the advance selection mode or the post-selection mode. When receiving a first elapsed time from the first timer 12, the control unit 13 compared it with the first time T1. If the first elapsed time is shorter than the first time T1, the control unit 13 judges that the advance selection mode should be established. This is because data to be transmitted is determined in advance and hence the time from completion of connection processing to transmission or reception data should be short. On the other hand, in the post-selection mode, since transmission data is selected after completion of connection processing, the first elapsed time should be longer than in the advance selection mode. Therefore, if the first elapsed time is longer than or equal to the first time T1, the control unit 13 judges that the post-selection mode should be established.

When receiving a second elapsed time from the second timer 14, the control unit 13 compares it with the second time T2 or the third time T3. The second time T2 is shorter than the third time T3 (T2<T3).

In the advance selection mode, the control unit 13 compares the second elapsed time with the second time T2. If the second elapsed time is longer than the second time T2, the control unit 13 determines that a transition should be made to the sleep mode. In the post-selection mode, the control unit 13 compares the second elapsed time with the third time T3. If the second elapsed time is longer than the third time T3, the control unit 13 determines that a transition should be made to the sleep mode. The control unit 13 informs the power control unit 15 and the radio unit 11 that a transition should be made to the sleep mode.

In the sleep mode, the control unit 13 receives a third elapsed time from the second timer 14. The control unit 13 compares it with a fourth time T4 or a fifth time T5. The fourth time T4 is shorter than the fifth time T5 (T4<T5). The second time T2 may be identical to the fourth time T4 (T2=T4), and third time T3 may be identical to the fifth time T5 (T3=T5).

In the advance selection mode, the control unit 13 compares the third elapsed time with the fourth time T4. If the third elapsed time is longer than the fourth time T4, the control unit 13 instructs the receiving unit 111 to perform carrier sense processing.

In the post-selection mode, the control unit 13 compares the third elapsed time with the fifth time T5. If the third elapsed time is longer than the fifth time T5, the control unit 13 instructs the receiving unit 111 to perform carrier sense processing.

When receiving a power value which is a carrier sense result from the receiving unit 111, the control unit 13 compared it with a threshold value. If the power value is larger than the threshold value, the control unit 13 instructs the power control unit 15 to finish the sleep mode.

In the sleep mode, when receiving, from the transmission buffer 17, a notice to the effect that it has received a transmission signal from the upper layer, the control unit 13 determines that the sleep mode should be finished. The control unit 13 informs the power control unit 15 that the sleep mode should be finished. The control unit 13 generates a wake signal and passes it to the transmitting unit 112.

The power control unit 15 supplies power to the individual units of the first radio apparatus 1 from a power unit (not shown). When receiving, from the control unit 13, a notice to the effect that a transition should be made to the sleep mode, the power control unit 15 suspends the supply of power to the radio unit 11 except when carrier sense processing is performed. If the control unit 13 instructs the receiving unit 111 to perform carrier sense processing, the power control unit 15 supplies power to the receiving unit 111.

The configuration of the second radio apparatus 2 is the same as that of the first radio apparatus 1 and hence will not be described.

Figure 3:
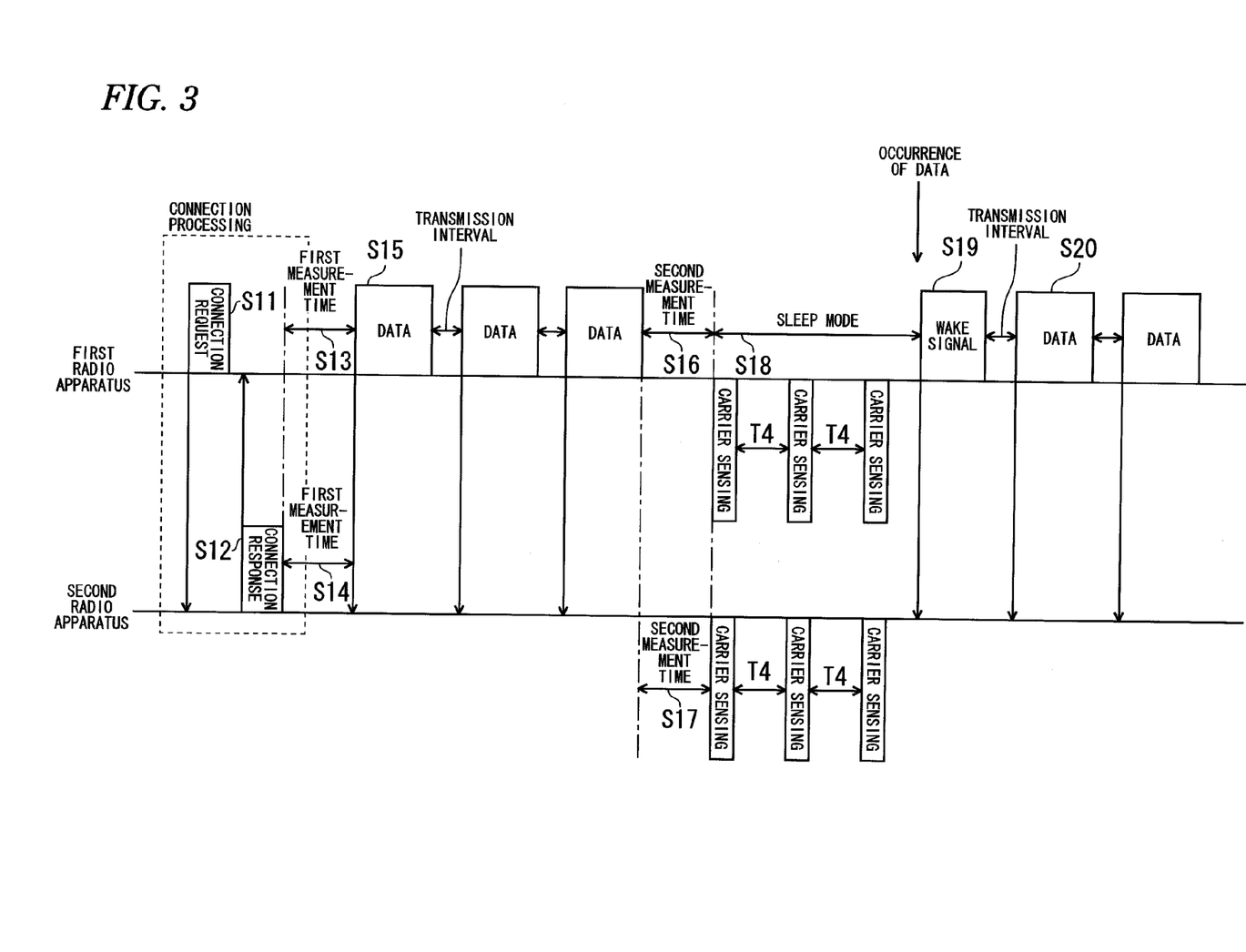
FIG. 3 is a sequence diagram showing how the radio system according to the first embodiment operates.
Figure 4:
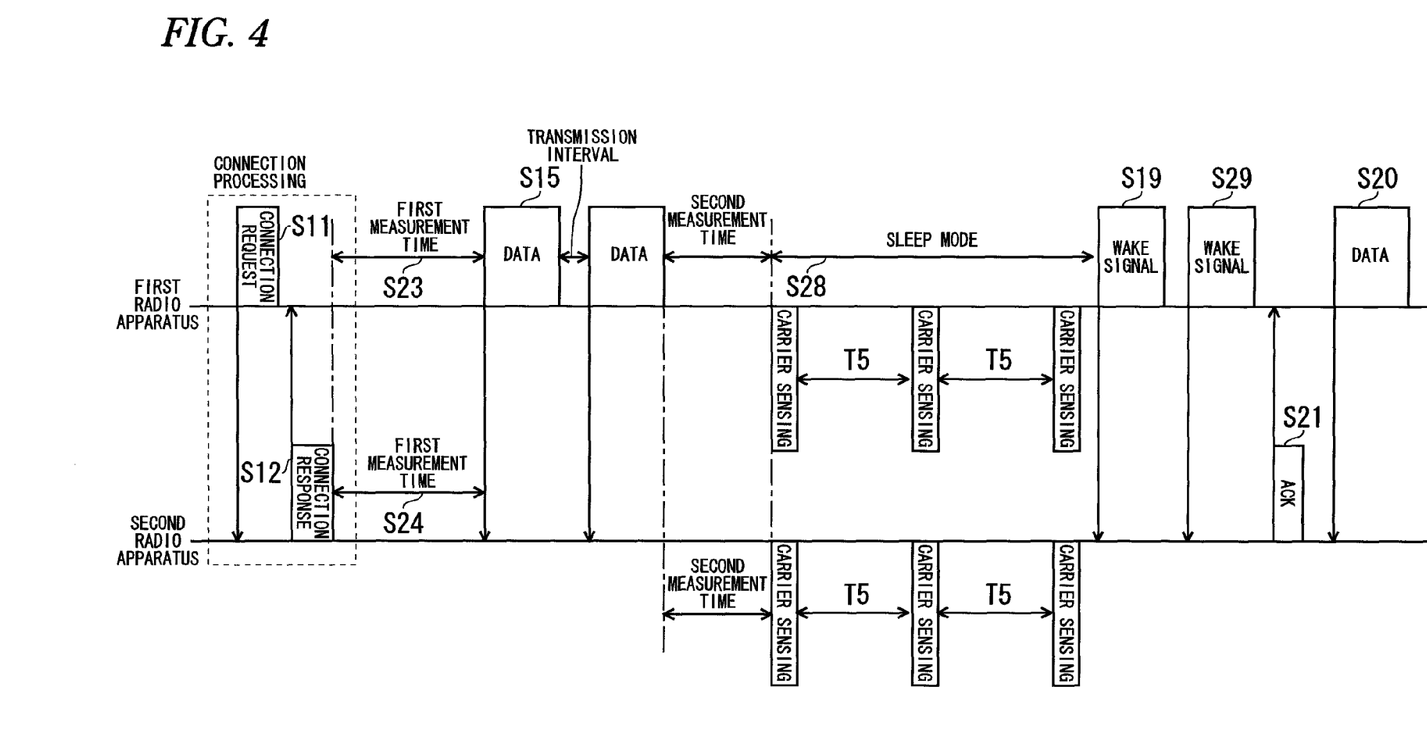
FIG. 4 is a sequence diagram showing how the radio system according to the first embodiment operates.

Next, how the radio system operates will be described with reference to FIGS. 3 and 4. FIG. 3 is a sequence diagram showing how the radio system operates in the advance selection mode. A case that the first radio apparatus 1 sends data selected by a user to the second radio apparatus 2 will be described below. It is assumed that connection processing is started when the first radio apparatus 1 sends out a connection request signal.

After the user selects data he or she wants to download, the user brings the first radio apparatus 1 close to the second apparatus 2, whereupon the first radio apparatus 1 and the second radio apparatus 2 start connection processing. More specifically, the first radio apparatus 1 sends a connection request signal to the second radio apparatus 2 (S11). When receiving the connection request signal, the second radio apparatus 2 returns a connection response signal (S12). The connection processing is thus completed.

The first radio apparatus 1 measures, as a first measurement time, a time from completion of reception of the connection response signal to transmission of data by the transmitting unit 112 (S13). The first radio apparatus 1 compares the first measurement time with the first time T1. In this case, the first measurement time is shorter than the first time T1 and hence the first radio apparatus 1 determines that the advance selection mode should be established.

The second radio apparatus 2 measures, as a first measurement time, a time from completion of the transmission of the connection response signal to reception of data from the first radio apparatus 1 (S14). The second radio apparatus 2 compares the first measurement time with the first time T1. In this case, the first measurement time is shorter than the first time T1 and hence the second radio apparatus 1 determines that the advance selection mode should be established.

The first radio apparatus 1 divides data held by the transmission buffer 17 into plural data and sends the divisional data in a burst-like manner at constant transmission intervals (S15). The transmission interval is set equal to an IFS (interframe space), for example. Burst-like transmission means that data are sent consecutively at intervals that are shorter than or equal to the IFS plus the fourth time T4.

The first radio apparatus 1 starts measurement of a second elapsed time from completion of the transmission of the divisional data (S16). The second radio apparatus 2 starts measurement of a second elapsed time from completion of the reception of the divisional data (S17).

Each of the first radio apparatus 1 and the second radio apparatus 2 makes a transition to the sleep mode if it does not receive data even if the second elapsed time becomes longer than the second time T2 (S18). In the sleep mode, each of the first radio apparatus 1 and the second radio apparatus 2 performs carrier sense processing at intervals that are equal to the fourth time T4.

Now assume that transmission data occurs in the sleep mode and is passed from the upper layer to the transmission buffer 17 of the first radio apparatus 1. In this case, the control unit 13 of the first radio apparatus 1 generates a wake signal. The transmitting unit 112 of the first radio apparatus 1 sends the wake signal to the second radio apparatus 2 (S19). The signal length Tw of the wake signal is set longer than or equal to the fourth time T4 and shorter than the fifth time T5 (T4≦Tw<T5). After sending the wake signal, the first radio apparatus 1 sends the data held by the transmission buffer after a lapse of a transmission interval (S20).

If receiving the wake signal while performing carrier sense processing, the second radio apparatus 2 finishes the sleep mode. After receiving the wake signal, the second radio apparatus 2 receives the data after a lapse of the transmission interval. The first radio apparatus 1 and the second radio apparatus 2 execute steps S15-S20 repeatedly until they are disconnected from each other.

Next, how the radio system operates in the post-selection mode will be described with reference to FIG. 4. A user brings the first radio apparatus 1 close to the second apparatus 2, whereupon a connection is established between the first radio apparatus 1 and the second radio apparatus 2. After the establishment of the connection between the first radio apparatus 1 and the second radio apparatus 2, the user selects data. The connection processing will not be described because it is the same as in the operation of FIG. 3.

The first radio apparatus 1 measures, as a first measurement time, a time from completion of reception of a connection response signal to transmission of data by the transmitting unit 112 (S23). The first radio apparatus 1 compares the first measurement time with the first time T1. In this case, the first measurement time is longer than or equal to the first time T1 and hence the first radio apparatus 1 determines that the post-selection mode should be established.

The second radio apparatus 2 measures, as a first measurement time, a time from completion of the transmission of the connection response signal to reception of data from the first radio apparatus 1 (S24). The second radio apparatus 2 compares the first measurement time with the first time T1. In this case, the first measurement time is longer than or equal to the first time T1 and hence the second radio apparatus 1 determines that the post-selection mode should be established.

The first radio apparatus 1 divides data held by the transmission buffer 17 into plural data and sends the divisional data in a burst-like manner at constant transmission intervals (S15).

The first radio apparatus 1 starts measurement of a second elapsed time from completion of the transmission of the divisional data (S16). The second radio apparatus 2 starts measurement of a second elapsed time from completion of the reception of the divisional data (S17).

Each of the first radio apparatus 1 and the second radio apparatus 2 makes a transition to the sleep mode if it does not receive data even if the second elapsed time becomes longer than the third time T3 (S28). In the sleep mode, each of the first radio apparatus 1 and the second radio apparatus 2 performs carrier sense processing at intervals that are equal to the fifth time T5.

Now assume that transmission data occurs in the sleep mode and is passed from the upper layer to the transmission buffer 17 of the first radio apparatus 1. In this case, the control unit 14 of the first radio apparatus 1 generates a wake signal. The transmitting unit 112 of the first radio apparatus 1 sends the wake signal to the second radio apparatus 2 (S19). Since the second radio apparatus 2 is performing carrier sense processing at intervals that are longer than the signal length Tw of the wake signal, the second radio apparatus 2 may not recover from the sleep mode even if the first radio apparatus 1 sends the wake signal once. Therefore, the first radio apparatus 1 sends the wake signal repeatedly until a response signal ACK to the wake signal is returned from the second radio apparatus 2 (S29).

If receiving the wake signal while performing carrier sense processing, the second radio apparatus 2 finishes the sleep mode and sends a response signal ACK to the wake signal (S21). When receiving the response signal ACK, the first radio apparatus 1 sends the data held by the transmission buffer (S20). The first radio apparatus 1 and the second radio apparatus 2 execute steps S15-S20 repeatedly until they are disconnected from each other.

As described above, in the radio system according to the first embodiment, the time to elapse until transition to the sleep mode and the carrier sense interval are adjusted according to whether a user selects data he or she wants to download before establishment of a connection between the first radio apparatus 1 and the second radio apparatus 2 (advance selection mode) or after establishment of a connection (post-selection mode). In the advance selection mode, a large amount of data would be transmitted in a short period because data to be transmitted is determined in advance. On the other hand, in the post-selection mode, data would be transmitted irregularly over a long period because data to be transmitted is determined each time. In view of these facts, in the radio system according to the embodiment, in the advance selection mode in which a large amount of data would be transmitted in a short period, the power consumption can be reduced by making a transition to the sleep mode in a short time. And the time taken to recover from the sleep mode can be made short by setting the carrier sense interval short. In the post-selection mode, the power consumption is reduced by setting the carrier sense interval long though the time to elapse until transition to the sleep mode is set long.

In the radio system according to the embodiment, the power consumption of the system is reduced by changing the method for making a transition to the sleep mode by switching between the advance selection mode and the post-selection mode in the above-described manner. Furthermore, in radio system according to the embodiment, switching between the advance selection mode and the post-selection mode is made according to a first measurement time from completion of connection processing to transmission or reception of data. Therefore, switching between the advance selection mode and the post-selection mode can be made with no communication between the first radio apparatus 1 and the second radio apparatus 2.

In the embodiment, the signal length of a wake signal Tw is set longer than or equal to the carrier sense interval in the advance selection mode. With this measure, in the advance selection mode, the first radio apparatus 1 can start transmission of data without receiving a response signal ACK to a wake signal, whereby the time taken from recovery from the sleep mode to transmission of data can be shortened.

Even in the post-selection mode, the first radio apparatus 1 according to the embodiment causes the second radio apparatus 2 to recover from the sleep mode using a wake signal as in the case of the advance selection mode. Alternatively, a signal whose signal length is longer than the fifth time T5 may be used for this purpose. However, the use of a wake signal allow the first radio apparatus 1 to recover from the sleep mode in a time corresponding to the signal length of a wake signal in the shortest case also in the post-selection mode.

In the above-described example, the first timer 12 and the second timer 14 pass measured first to third elapsed times to the control unit 13 and the control unit 13 compares the first to third elapsed times with the first to fifth times T1-T5. However, an alternative configuration is possible in which the first timer 12 and the second timer 14 compares first to third elapsed times with the first to fifth times T1-T5 and informs the control unit 13 of comparison results.

A radio system according to a second embodiment of the invention will be described. The radio system according to this embodiment has a first radio apparatus 3 and a second radio apparatus 4. The first radio apparatus 3 and the second radio apparatus 4 have the same configuration as the first radio apparatus 1 shown in FIG. 2 except that the former have a third timer 18. The radio system according to this embodiment is characterized in that switching is made from the advance selection mode to the post-selection mode if no data has been sent or received even after a lapse of a sixth time T6 in the case where a transition was made to the sleep mode in the advance selection mode.

Figure 5:
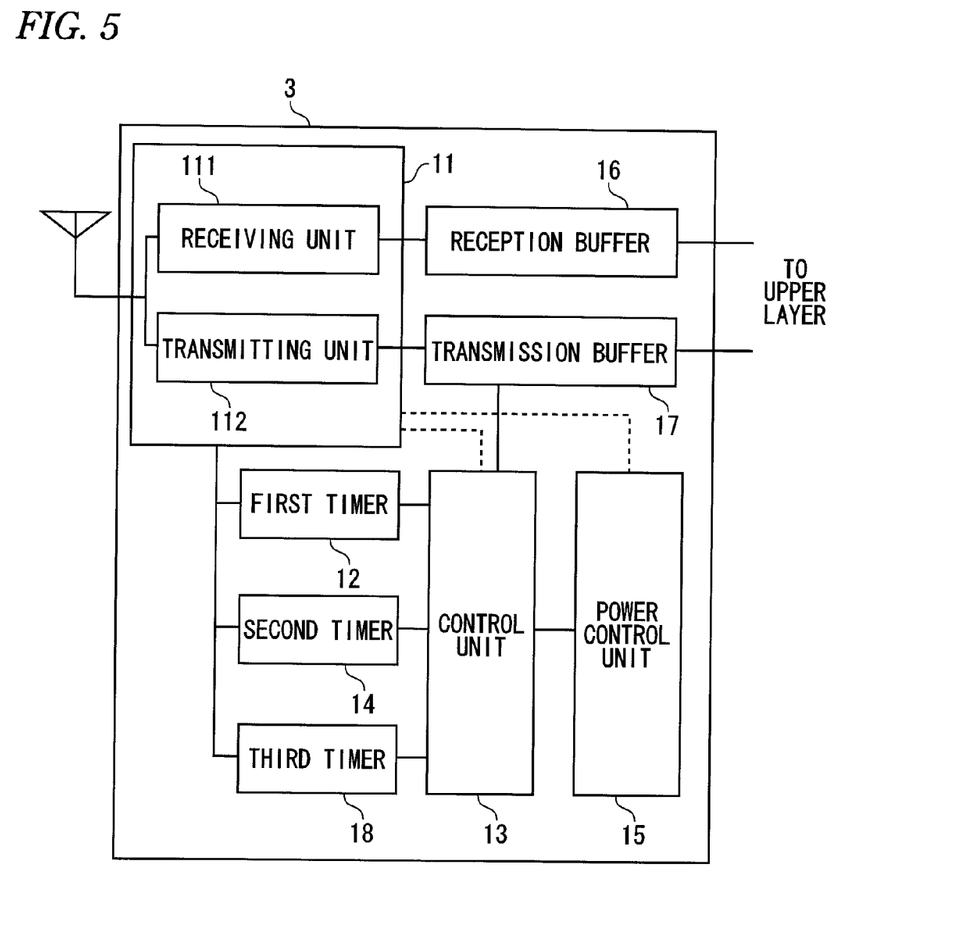
FIG. 5 shows a first radio apparatus 3 according to a second embodiment.

The configuration of the first radio apparatus 3 will be described with reference to FIG. 5.

When receiving, from the control unit 13, a notice to the effect that a transition is being made to the sleep mode, the third timer 18 of the first radio apparatus 3 starts measurement of a fourth elapsed time. The third timer 18 informs the control unit 13 of the fourth elapsed time in a constant cycle.

When receiving the fourth elapsed time, the control unit 13 compares the fourth elapsed time with the sixth time T6. If the fourth elapsed time is longer than the sixth time T6 in the advance selection mode, the control unit 13 switches from the advance selection mode to the post-selection mode. The control unit 13 communicates a switching notice to the effect that switching has been made to the post-selection mode to the power control unit 15.

The configuration of the second radio apparatus 4 is the same as that of the first radio apparatus 3 and hence will not be described.

Figure 6:
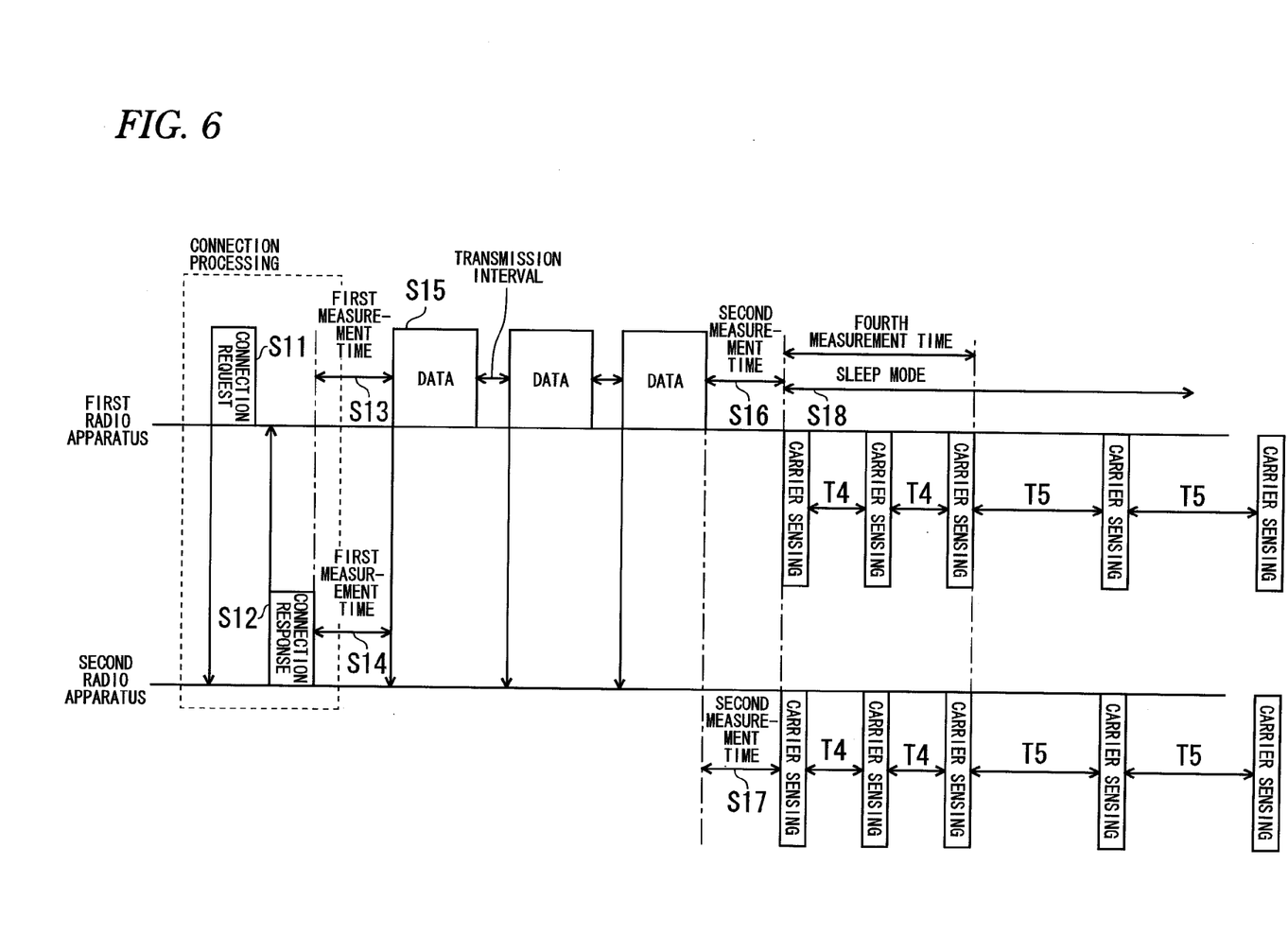
FIG. 6 is a sequence diagram showing how the radio system according to the second embodiment operates.

Next, how the radio system operates will be described with reference to FIG. 6. The operation in the post-selection mode is the same as shown in FIG. 4 and hence will not be described. A description will be made of a case that the first radio apparatus 3 and the second radio apparatus 4 operate in the advance selection mode. The first radio apparatus 3 and the second radio apparatus 4 operate in the same manners as shown in FIG. 3 to transition to the sleep mode (S18).

Upon transition to the sleep mode, each of the first radio apparatus 3 and the second radio apparatus 4 starts measurement of a fourth elapsed time with the third timer 18. The second timer 14 of each of the first radio apparatus 3 and the second radio apparatus 4 starts measurement of a second elapsed time. As a result, each of the first radio apparatus 3 and the second radio apparatus 4 performs carrier sense processing repeatedly at intervals that are equal to the fourth time T4.

If neither the first radio apparatus 3 nor the second radio apparatus 4 has sent or received a signal even when the fourth elapsed time measured by the third timer 18 has become longer than the sixth time T6, that is, the sixth time T6 has elapsed from the transition to the sleep mode, the control unit 13 of each of the first radio apparatus 3 and the second radio apparatus 4 switches from the advance selection mode to the post-selection mode. Upon the switching to the post-selection mode, each of the first radio apparatus 3 and the second radio apparatus 4 changes the interval of the carrier sense processing to the fifth time T5. The subsequent processing is the same as in the post-selection mode.

As described above, the radio system according to the second embodiment provides, in addition to the same advantages as provided by the radio system according to the first embodiment, an advantage that the power consumption can be made even lower by switching to the post-selection mode if no signal has been sent or received even after a lapse of the prescribed time from transition to the sleep mode in the advance selection mode.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A radio apparatus configured to send or receive data with a communication partner after performing connection processing, the radio apparatus comprising:
 a radio unit configured to transmit and receive the data;
 a timer configured to count a first measurement time from completion of the connection processing to transmission or reception of the data;
 a control unit configured to establish a first mode if the first measurement time is shorter than a first time T1, and establish a second mode if the first measurement time is longer than or equal to the first time T1; and
 a power control unit configured to control power to be supplied to the radio unit if the first mode is set and next data is not received even if a second time T2 elapsed from transmission or reception of the data by the radio unit, and control power to be supplied to the radio unit if the second mode is set and next data is not received even if a third time T3 (T3>T2) elapsed from reception of the data by the radio unit, wherein
 the radio unit makes a transition to a sleep mode as a result of a power control by the power control unit.

2. The radio apparatus according to claim 1, wherein carrier sensing is performed at intervals that are equal to a fourth time T4 if the transition to the sleep mode is made in the first mode, and at intervals that are equal to a fifth time T5 (T5>T4) if the transition to the sleep mode is made in the second mode.

3. The radio apparatus according to claim 2, further comprising
 a buffer configured to store data, wherein:
 if data to be transmitted is stored in the buffer in the first mode, the radio unit sends out a wake signal that is longer than the fourth time T4 is shorter than the fifth time T5 and sends out the data after a lapse of an IFS from the sending of the wake signal; and
 if data to be transmitted is stored in the buffer in the second mode, the radio unit sends out a wake signal that is longer than the fourth time T4 is shorter than the fifth time T5 and sends out the data if a response signal to the wake signal is received from the communication partner.

4. The radio apparatus according to claim 3, wherein the control unit switches from the first mode to the second mode if no data is received even if a sixth time elapsed from the transition to the sleep mode.

\* \* \* \* \*